United States Patent [19]

Magistro

[11] Patent Number: 5,037,794
[45] Date of Patent: Aug. 6, 1991

[54] ATTRITION RESISTANT CATALYST SUPPORT

[75] Inventor: Angelo J. Magistro, Brecksville, Ohio

[73] Assignee: The B. F. Goodrich Company, Akron, Ohio

[21] Appl. No.: 405,909

[22] Filed: Sep. 12, 1989

[51] Int. Cl.$^5$ .............................................. B01J 21/04
[52] U.S. Cl. .................................. 502/355; 502/415; 502/439
[58] Field of Search ................... 502/355, 439, 415

[56] References Cited

U.S. PATENT DOCUMENTS

| | | | |
|---|---|---|---|
| 3,898,184 | 8/1975 | Hara et al. | 502/313 |
| 4,019,978 | 4/1977 | Miller et al. | 502/211 |
| 4,111,853 | 9/1978 | Shultz et al. | 252/536 |
| 4,170,570 | 10/1979 | Zagata et al. | 502/211 |
| 4,280,929 | 7/1981 | Shaw et al. | 502/215 |
| 4,379,134 | 4/1983 | Weber et al. | 423/628 |
| 4,453,006 | 6/1984 | Shaw et al. | 502/200 |
| 4,770,869 | 9/1988 | Misra et al. | 502/415 |

Primary Examiner—Anthony McFarlane
Attorney, Agent, or Firm—Thoburn T. Dunlap

[57] ABSTRACT

Alpha-alumina particles having a combination of low attrition, thermal stability and fluidizability are disclosed. The alpha-alumina particles are characterized by being devoid of crystalline grain boundaries. The particles are useful as support or carriers for a wide variety of catalysts, especially as catalyst carriers in high temperature catalytic processes.

6 Claims, 4 Drawing Sheets

ATTRITION RESISTANT CATALYST SUPPORT

BACKGROUND OF THE INVENTION

1. Field of the Invention

This invention relates to attrition resistant alumina catalyst supports. More particularly, this invention relates to fluidizable alpha-alumina catalyst supports having improved attrition and high temperature resistance. The alpha-alumina supports of the present invention can be doped or impregnated with appropriate active metal(s) to obtain desired catalytic properties.

2. Background

Those skilled in the art have long recognized the advantages of fluid-bed catalytic processes over fixed-bed catalytic processes. Such advantages include improvement of temperature control and heat transfer, resulting in greater reactor efficiencies. The activity, efficiency, stability, and durability of a catalyst in a fluidized-bed catalytic reaction depend, to a large degree, upon the structural and physical properties of the catalyst support material. A problem, however, with the use of certain support materials is attrition of the support particles by abrasion of the surface of the support particle or fracture of the support particle itself. Excessive particle attrition is caused, for example, by particle to particle contact, abrasion with bed walls and bed internals, as well as distributor jet impingement and abrasion in circulation conduits leading to and from the reactor bed. High particle attrition contributes to product contamination, catalyst loss, plugging of downstream equipment, high filtration costs, and unstable fluidization behavior such as channeling, slugging or increased entrainment of reactants. The deleterious effects of fluidized-bed operations are exacerbated by high temperature conditions.

It has been well-known that aluminum oxide ($Al_2O_3$) is an excellent support material for catalysts in a wide range of chemical reactions. Various forms of aluminum oxide (hereinafter referred to as alumina) occur in nature and many have been produced synthetically. Among the conventional catalyst supports for use in catalytic processes, most have been produced from gamma-alumina which is generally characterized by having high surface area, low bulk density, and high mechanical strength. Under high temperature conditions, however, gamma-alumina undergoes changes through various crystalline phases (e.g., delta, eta, theta, kappa, chi, and rho), ultimately transforming into alpha-alumina. Alpha-alumina, the final product of aluminum oxide thermal transformation, is chemically and thermally stable. Because of its thermal and chemical stability, it would be highly desirable to utilize alpha-alumina as a catalyst support in high temperature catalytic processes. However, the aforementioned crystalline transformation is accompanied by a large reduction in surface area with the formation of irregularly shaped, brittle particles that are highly subject to attrition, and an almost complete loss of mechanical strength. Consequently, alpha-alumina has found little use in high temperature catalytic processes, particularly as a carrier or support material for fluid-bed catalysts.

In the past, attempts have been made to produce alpha-alumina with sufficient strength and attrition resistance in order to take advantage of its inherent thermal and chemical stability properties. It is known that the attrition resistance of a support such as a fluid-type catalyst support can be increased by incorporating binders into and onto the catalyst support matrix. The use of binders, however, introduces additional entities into and onto the support that may have their own reactivities, resulting in competing side reactions. A further disadvantage with binders is that they can decrease the surface area, increase the bulk density, and decrease the pore volume of a catalyst support. In addition, most binders will not have sufficient thermal stability to be useful in many high temperature catalytic processes.

The commercial utility of catalyst compositions in reactions which involve conditions of high stress (such as high temperatures and/or pressure, especially under fluidized-bed conditions) require support or carrier materials that are highly resistant to abrasion and attrition. Catalyst researchers continue to look for high efficiency catalysts and supports of increased stability, physical strength, and attrition resistance, and that are useful in reactions involving conditions of high stress. Thus, the ability to employ attrition resistant catalysts supported on alpha-alumina in fluidized-beds, particularly, under high temperature conditions without the use of binders would be highly desirable.

SUMMARY OF THE INVENTION

Accordingly, it is a basic objective of the present invention to obviate the deficiencies of conventional alpha-alumina.

In particular, it is an objective of the present invention to provide a thermally stable and attrition resistant catalyst support material suitable for fluid-bed catalytic processes.

It is a further objective of the present invention to provide a new and novel alpha-alumina support which is suitable as a support for catalytically active components.

The above and other objectives of the invention are accomplished by providing a catalyst support comprising an inert substrate of alpha-alumina, wherein the alpha-alumina ultimate articles are devoid or substantially devoid of any fractures, cracks or crystalline grain boundaries.

DETAILED DESCRIPTION OF THE INVENTION

Figure 1:
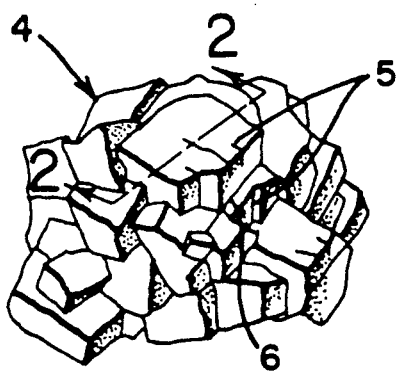
FIG. 1 represents a diagramatic view of a prior art alpha-alumina primary particle aggregate.
Figure 2:
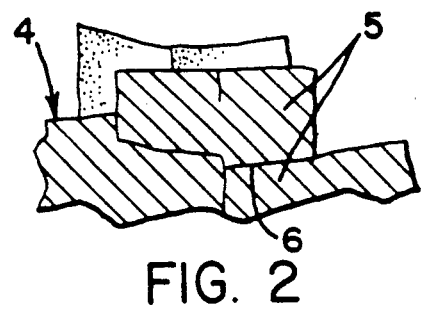
FIG. 2 is a cross-sectional view taken on line 2—2 of FIG. 1.
Figure 3:
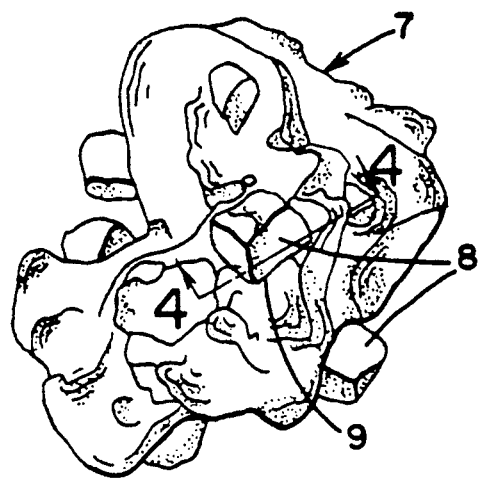
FIG. 3 represents a diagramatic view of a prior art alpha-alumina Primary particle agglomerate.
Figure 4:
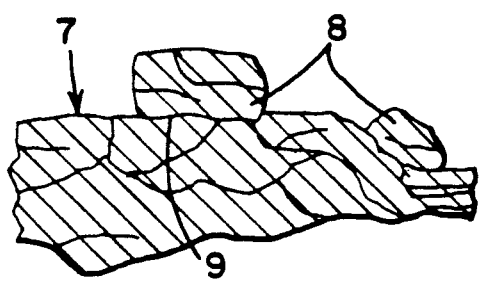
FIG. 4 is a cross-sectional view taken on line 4—4 of FIG. 3.

Upon examination under the electron microscope, the present inventor has found that conventional gamma-alumina catalyst carriers are composed of a plurality of irregularly shaped ultimate particles closely and rigidly grouped or clustered together (e.g., aggregated or agglomerated). These aggregated or agglomerated ultimate particles form what is herein referred to as the primary particles. FIGS. 1 and 3 represent prior art alpha-alumina primary particles 4 and 7 which are aggregations or agglomerations of ultimate particles 5 and 8, respectively. The primary particles are characterized by a myriad of channels, voids, fractures and cracks that define the boundaries between adjacent ultimate particles. The ultimate particles also contain grain boundaries, boundary lines separating regions of the particles with different crystal structure orientations. Although random in nature, these grain boundary lines are substantially, uniformly distributed throughout a primary particle. FIGS. 2 and 4 are cross-sectional representations of the prior art primary particles depicting crystalline grain boundaries 6 and 9.

When exposed to high temperatures, alumina sequentially transforms from an amorphous or transitionally crystallized state (e.g., gamma, delta, eta, etc.) to a highly crystallized state (e.g., alpha). During this transformation the alumina ultimate particles become more crystalline (accompanied by a reduction in surface area) and the crystalline grain boundaries between adjacent ultimate particles become more stressed, resulting in loss of adhesive forces between the ultimate particles. This phenomenon significantly attributes to attrition. Any subsequent thermal and/or mechanical shock delivered to the primary particles leads to fracture along these crystalline grain boundaries resulting in attrition of the ultimate particle.

Figure 5:
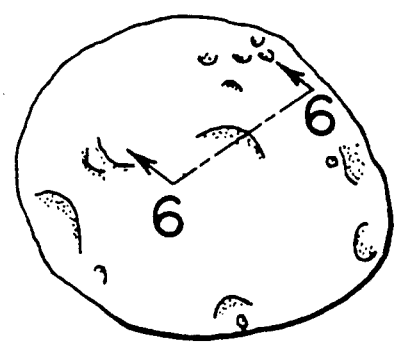
FIG. 5 represents a diagramatic view of the alpha-alumina primary particle of the present invention.
Figure 6:
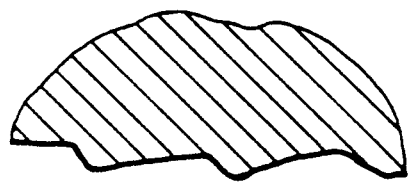
FIG. 6 is a cross-sectional view taken on line 6—6 of FIG. 5.
Figure 7:
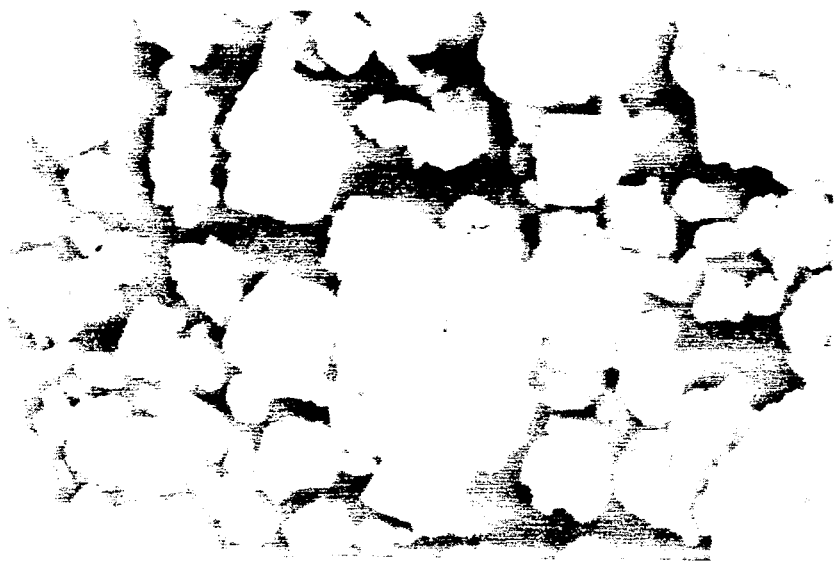
FIG. 7 is a photomicrograph of alumina trihydrate primary particle aggregates at 1000×.
Figure 8:
FIG. 8 is a photomicrograph at 500× of the Ketjen gamma-alumina precursors of the present invention.

When viewed under the electron microscope, it is readily seen that the alpha-alumina of the present invention mainly exists of non-aggregated or non-agglomerated particles that are substantially free of crystalline boundaries. In other words, the primary particles are themselves the ultimate particles. FIGS. 5 and 6 illustrate the morphology of a primary particle of the present invention. Since the particles are devoid of crystalline grain boundaries, they are resistant to attrition. The present inventor has discovered that the attrition problem with conventional alpha-alumina was found to be related to the starting structure (morphology) of the gamma or other precursor alumina utilized in the manufacture of the alpha-alumina. These precursor aluminas were found to contain crystalline grain boundaries as previously described. FIG. 7, for example, is a SEM photograph (scanning electron microscopy) of precursor alumina trihydrate wherein the crystalline boundary lines between ultimate particles are clearly evident. In sharp contrast, the precursor aluminas to the attrition resistant alpha-alumina of the present invention contain no crystalline grain boundaries as shown in FIG. 8. In order to have a low attrition alpha-alumina catalyst support, the starting (precursor) alumina particles should be devoid or substantially devoid of any crystalline grain boundaries, fractures or cracks and should not consist of an aggregation or agglomeration of ultimate particles.

Attrition resistance also depends on the physical form of the particles. Spheroidal particles with smooth surfaces will have lower attrition losses than particles with irregular shapes and rough edges. The term spheroidal also is meant to include spherical, eliptical, oblong, globular, and the like so long as there are no irregular or sharp edges that are prone to attrit during handling or fluidization.

A satisfactory alumina starting material for the attrition resistant alpha-alumina support of the present invention is gamma-alumina which is commercially available from Ketjen, a subsidiary of Akzo Chemical BV, Amersfoort, the Netherlands, under grade designations E and ES. These particular grade designations of gamma-alumina are characterized by having no crystalline grain boundaries when viewed under the electron microscope and exist as a collection of unattached ultimate particles (as readily seen in FIG. 8). It also should be realized that within the scope of the present invention, any alumina precursor such as, for example, alumina trihydrate and other gamma-alumina or transition phase alumina (e.g., delta, eta, theta, kappa, chi, and rho) may be utilized as precursor materials so long as the foregoing conditions are met.

Figure 9:
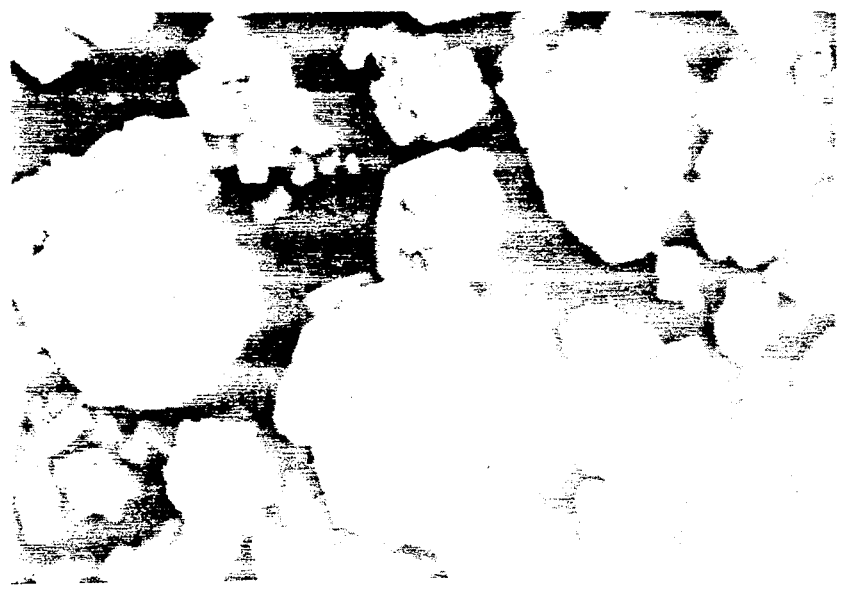
FIG. 9 is a photomicrograph of alpha-alumina at 1000× prepared from alumina hydrate.
Figure 10:
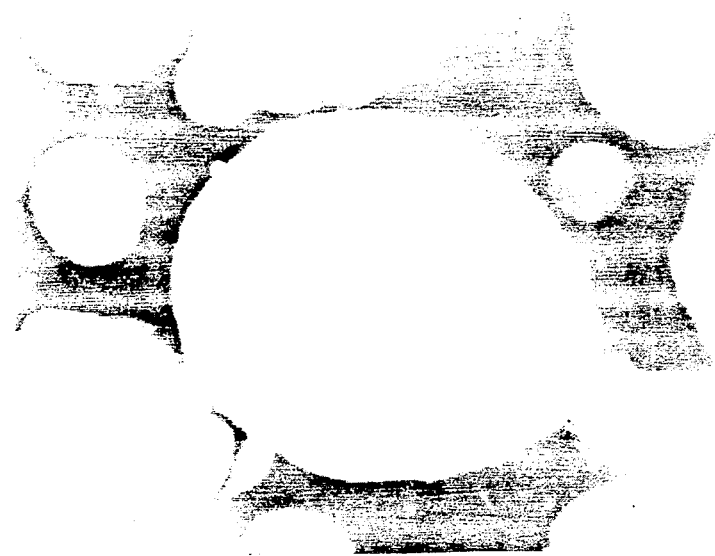
FIG. 10 is a photomicrograph of the attrition resistant alpha-alumina support particles of the present invention at 500×.

Most thermally induced solid state phase transformations in a polycrystalline material such as alumina occur without retention of particle morphology. FIG. 9 shows a photomicrograph of alpha-alumina primary particles prepared from alumina trihydrate precursor pictured in FIG. 7. Tests confirm that the alpha-phase is significantly more attrition prone than its aluminum hydrate precursor (see Table II). The original particles become weaker and/or fracture as they undergo transformation to the new crystalline phase. Subsequent crystal grain growth, dependent upon the reaction conditions, can further alter the shape and size of the product particles. Surprisingly, SEM has shown that the morphology of the starting or precursor alumina particles of the present invention is maintained on conversion to the alpha-alumina phase. Consequently, the resulting alpha-alumina particles are highly attrition resistant and fluidizable. FIG. 10 is a SEM photomicrograph of the alpha-alumina catalyst support particles of the present invention calcined at 1250° C. Even at high conversion temperatures, the primary particles are devoid or substantially devoid of cracks, fractures, and/or grain boundaries.

The alpha-alumina catalyst support of the present invention is prepared from the Ketjen precursors set forth above (or other aluminas, gamma-aluminas or transitional aluminas that meet the specific requisites) by any convenient method known in the art for preparing alpha-alumina from gamma or other alumina precursors. In order to convert the precursor alumina to the alpha-phase, the precursor material is heated to at least about 1150° C. Temperatures lower than about 1150° C. do not result in substantial conversion of the precursor alumina to the alpha-alumina phase. While temperatures to about 1700° C. or higher may be employed, it should be noted that the alpha-alumina obtained at higher temperatures have lower surface areas. The conversion is preferably carried out between about 1150° C. and 1300° C., and most preferably at about 1250° C. A calcination time of about 4 to 24 hours is required to obtain substantially complete conversion to alpha-alumina, although shorter or longer times (contingent upon temperature) may be employed without detriment to the support. The calcination may be effected in any calcination apparatus known in the art. Nonlimiting examples include ovens, muffle furnaces or tunnel furnaces containing fixed beds or moving beds, rotary kilns, and the like.

The surface area of the resulting alpha-alumina is between about 0.1 to 14 m²/g, preferably from about 3 to 10 m²/g, and most preferably from about 5 to 7 m²/g. As noted above, the desired surface area can be arrived at by controlling the calcining conditions (e.g., time and temperature).

A special advantage of the fluidizable, attrition resistant, alpha-alumina catalyst supports of the present invention is that the surface areas of the support particles are relatively stable to changes in temperature and chemical environment. This is advantageous in high temperature catalytic processes in eliminating fluctuating reaction efficiencies due to changes in the surface area of the support material. Accordingly, the alpha-alumina catalyst supports of the present invention are particularly useful in a variety of high temperature catalytic processes (e.g., between about 500° C. to about 1000° C.), but can also be utilized at lower temperatures where a high attrition support might be useful.

The alpha-alumina is suitable as a support or carrier for catalytic materials, particularly a metal component, or metal components, as employed in the manufacture of catalyst for chemical processing, crude oil refining, and emission control.

The catalytic metal(s), usually in the form of salts, can be deposited, incorporated in, or intimately associated with the alpha-alumina support of the present invention. The simplest method involves intimately mixing the metal salts with the attrition resistant alpha-alumina support material of the present invention. The amount of metal salts utilized, of course, will depend upon the specific catalytic reaction and the desired rate of reaction and selectivity. The metal salts and alpha-alumina support are wet mixed by slurrying the mixture in a suitable wetting agent, for example, water or an organic compound such as methanol, ethanol, and the like. The slurried mixture is then dried at a temperature and for a time sufficient to substantially remove the excess wetting agent. Generally, heating at a temperature of about 100° C. to about 250° C., for 1 to 16 hours is sufficient. It will be recognized, however, that the actual time and temperature depend upon the particular wetting agent employed, the quantity of material and the like. The supported catalyst can, if desired, be heated in an active or inert atmosphere or calcined to achieve infusion or sintering of the active metal (as the element, oxide or other combined form) into and onto the support.

In an alternative method of preparation, a suitable precursor alumina (for example, alumina trihydrate, gamma or any of the transitional aluminas that meet the requisites set forth above) can be deposited with, incorporated with, or intimately associated with the catalytic metal salts as discussed previously, and dried, followed by calcination. It should be noted, however, that the calcination conditions should be such so as to convert the precursor aluminas into the alpha-form. The catalyst is dried or calcined under non-agglomerating conditions to prevent aggregation of the catalyst particles.

The alpha-alumina catalyst support of the present invention exhibits an attrition index of less than about 30, more preferably less than about 15, even more preferably less than about 10 and most preferably less than about 5. The term "attrition index" as employed herein refers to percent attrition as determined by the Roller attrition test. In this test, which is conducted in a Roller apparatus and described in detail below, a weighed sample of catalyst support material is subjected to an air jet formed by passing humidified air at 21 liters/min. through a 0.07 in. nozzle for one hour (initial phase). Initial phase fines are removed as formed and caught in a paper collection thimble and weighed. The remaining sample is then subjected to the same conditions for an additional 4-hour period (attrition phase). Dust and fines generated in the attrition phase via abrasion, friction, and breakage of the catalyst support are collected and weighed. The obtained values are used to calculate the attrition index of the support as follows:

Attrition Index (% Attrition) =

$$\frac{\text{Wt. of attrition phase fines}}{\text{Initial Sample Wt.} - \text{initial phase fines}} \times 100$$

Figure 11:
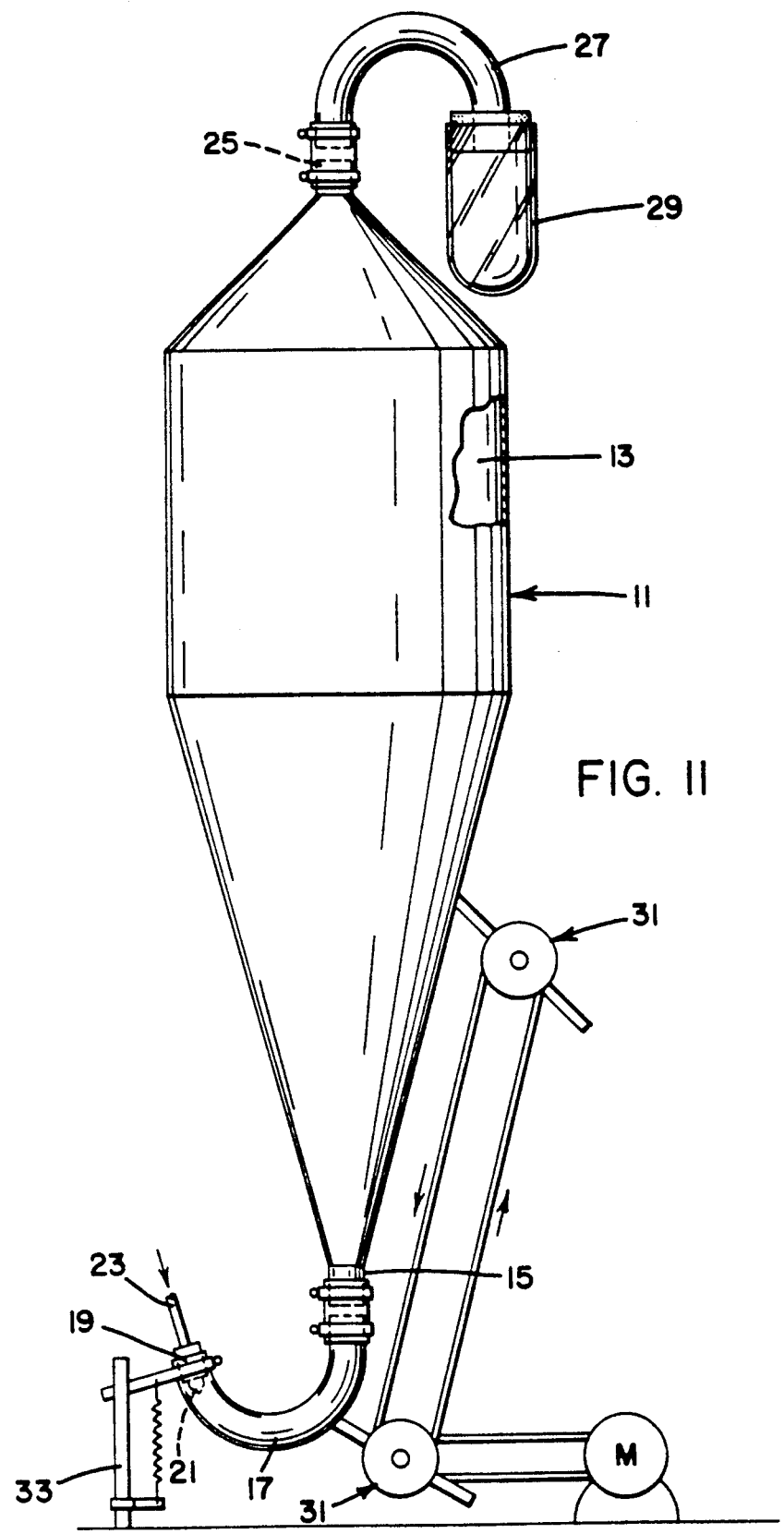
FIG. 11 is a side elevation view of the Roller apparatus utilized to conduct the attrition tests described.

The apparatus utilized to determine the attrition index is the Roller apparatus (model no. 5-445) manufactured by the American Instrument Company of Silver Springs, Maryland. The apparatus is illustrated in FIG. 11 and consists of stainless steel cylindrical tank 11 having an upper portion and a lower portion that are conically or funnel shaped, all of which together define a settling chamber 13. The lower conical portion is a longitudinally extending section that terminates into inlet port 15 which is connected at one end to U-shaped sample tube 17 (1 in. I.D.). Such inlet connection is a flexible connection permitting vertical movement of the sample tube for a purpose to be described. The other end of the sample tube has an inlet port 19 that receives removable jet nozzle 21 to permit the introduction of a given amount of test sample into the sample tube. The jet nozzle has an orifice (0.07 in.) to provide for the direction of a high velocity jet of air onto the test sample in the sample tube. A suitable inlet tube 23 has one end connected to the jet nozzle while its other end is connected to air supply means that is controlled in pressure and humidity.

The upper conical portion of tank 11 is a short conical section terminating into outlet port 25 that is connected via U-shaped collection tube 27 (1 in. I.D.) to paper collection thimble 29 (Whatman paper extraction thimble 123 mm × 43 mm I.D.). The paper collection thimble permits the flow of air while trapping any particles contained in the air. The connection between outlet port 25 and collection tube 27 is a flexible connection to permit the vibration of tank 11 without interfering with the flow of particles into the collection thimble.

Suitable rocking actuating means 31 intermittently contact tank 11 and sample tube 17 to impart a rocking motion to the sample tube (which is in a vertical direction only) and a moderately vibrating motion to tank 11 to keep the test sample from clinging to the inside surface of settling chamber 13. Guide means 33 are connected to the sample tube to restrict movement of said tube in a vertical direction only.

A weighed 15 ml sample of loosely packed catalyst support is placed into sample tube 17. Jet nozzle 7 is inserted into inlet port 19 of the sample tube and a continuous jet of air (50 to 70% relative humidity) is passed into the sample through the jet nozzle at a flow rate of 21 liters/min. The sample becomes fluidized in the sample tube and the fines generated via attrition are forced into settling chamber 13 of tank 11 wherein the fines and attrited particles are forced up through collection tube 27 and into collection thimble 29. The attrition index is calculated in accordance with the method and formula described above.

The invention now being generally described will be better understood by reference to certain specific examples which are included herein for purposes of illustration only and are not intended to be limiting of the invention or any embodiment thereof.

EXAMPLE 1

This example illustrates the preparation of the attrition resistant alpha-alumina catalyst support material of the present invention.

298 grams of commercially available Ketjen Grade E spheroidally shaped gamma-alumina particles (80-225 mesh) were calcined in a furnace at 1250° C. for 16 hours to convert the particles to the alpha-alumina phase. Typical particle properties are given in Table I.

TABLE I

| Properties | Before Calcination | After Calcination |
| --- | --- | --- |
| Surface Area* ($m^2/g$) | 151.9 | 9.3 |
| Total Pore Vol. (ml/g) | .38605 | .01862 |
| Ave. Pore Diameter* (A) | 101.7 | 80.3 |
| Alumina Phase | Gamma | Alpha |
| Crystal Crack Boundaries | Absent | Absent |

*B.E.T. Method

EXAMPLE 2

This example compares the attrition resistance of the alpha-alumina supports of the present invention to conventional alpha-aluminas. Samples of commercially available Ketjen Grade ES gamma-alumina, Alcoa C-31 alumina trihydrate, and Harshaw (AL-3922 P) gamma-alumina were calcined for 16 hours at 1050° C. and 1250° C. to obtain the transitional and alpha phases, respectively. Attrition numbers for each phase were determined via the Roller attrition test. Results are set forth in Table II. It is clearly illustrated that the alpha-alumina formed from the Ketjen gamma-alumina in accordance with the teachings of this invention has superior attrition resistance compared to the alpha-aluminas formed from conventional alpha-alumina precursor compounds.

TABLE II

| Starting Material | Calcination Temp. (°C.)/(Hrs.) | Crystal Phase | Attrition No. | Surface Area ($m^2/g$) |
| --- | --- | --- | --- | --- |
| Ketjen Grade ES[1] gamma-alumina | — | gamma | 2.7 | 151.9 |
| Ketjen Grade ES[1] gamma-alumina | 1050/(16) | Transition | 5.4 | 20.0 |
| Ketjen Grade ES[1] gamma-alumina | 1250/(16) | alpha | 7.9 | 9.3 |
| Harshaw AL-3922 P[2] | — | gamma | 17.5 | 134.9 |
| Harshaw AL-3922 P[2] | 1050/(16) | Transition | 23.8 | 20.0 |
| Harshaw AL-3922 P[2] | 1250/(16) | alpha | 72.5* | 3.1 |
| Alcoa C-31[3] (alumina hydrate) | — | — | 49.8 | 161.8 |
| Alcoa C-31[3] (alumina hydrate) | 1050/(16) | Transition | 62.9 | 13.4 |
| Alcoa C-31[3] (alumina hydrate) | 1250/(16) | alpha | 90.0* | 4.8 |

[1]available from Ketjen (Subsidiary of Akzo Chemical BV), Amersfoort, Netherlands
[2]available from Harshaw-Filtrol Chemical Company, Cleveland, OH
[3]available from Aluminum Company of America, Pittsburgh, PA
*Lowest possible value due to a large amount of fines carry-over

What is claimed is:

1. A catalyst support consisting of an attrition resistant fluidizable alpha-alumina particle wherein said particle is substantially devoid of crystalline grain boundaries, cracks and fractures and having an attrition number not exceeding 30 as measured by the Roller attrition test.

2. The catalyst support of claim 1 wherein the alpha-alumina is spheroidal.

3. The catalyst support of claim 1 having an attrition number not exceeding 15.

4. The catalyst support of claim 1 having an attrition number not exceeding 10.

5. The catalyst support of claim 1 wherein said alpha-alumina is thermally stable between about 500° C. and 1000° C.

6. A catalyst support consisting of a fluidizable, attrition resistant alpha-alumina particle wherein said particle is substantially devoid of crystalline grain boundaries, cracks and fractures and having an attrition number not exceeding 5 as determined by the Roller attrition test.

* * * * *